Dec. 10, 1935.   C. S. HAZARD   2,023,587
ROTOR MOUNTING FOR METERS
Filed June 4, 1934
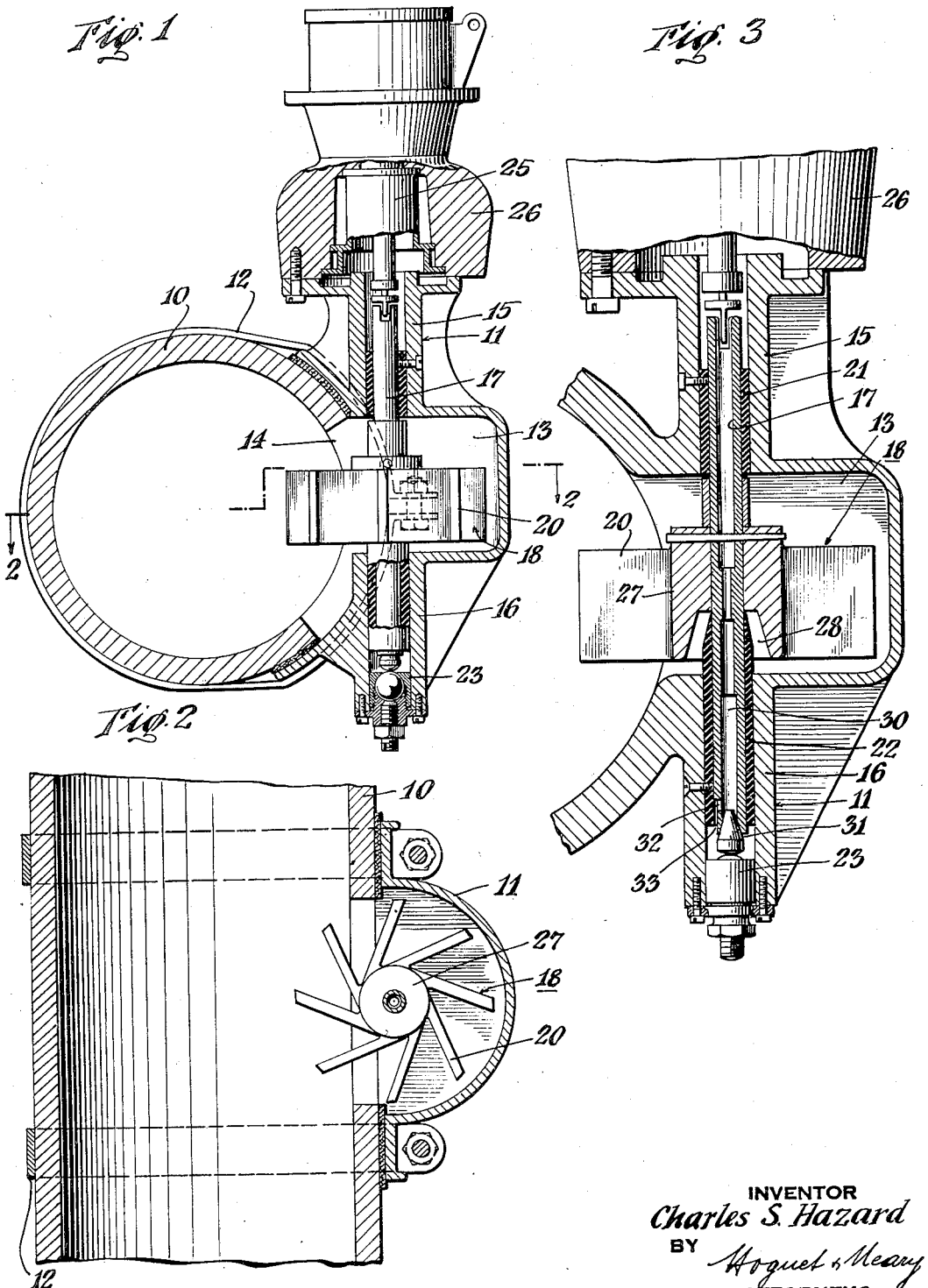
INVENTOR
Charles S. Hazard
BY
ATTORNEYS Patented Dec. 10, 1935

2,023,587

UNITED STATES PATENT OFFICE 2,023,587

ROTOR MOUNTING FOR METERS

Charles S. Hazard, New York, N. Y., assignor to Neptune Meter Company, a corporation of New Jersey Application June 4, 1934, Serial No. 728,883

5 Claims. (Cl. 308—168)

This invention relates to meters and particularly to an improved mounting for the rotor of a meter. In Patent 1,670,308, dated May 22, 1928, there is disclosed an irrigation meter for measuring the flow of water supplied for purposes of irrigation. One object of the present invention is to provide an improved mounting for the rotor of such a meter in order to reduce wear on the rotor bearings due to sand or other abrasive material entrained in the water.

In the drawing:

Figure 1 is a view in transverse sectional elevation of an irrigation meter embodying the invention.

Figure 2 is a sectional view along the line 2—2 in Figure 1; and

Figure 3 is an enlarged sectional view illustrating the rotor mounting.

In the drawing, the numeral 10 designates a tube adapted to be placed at a suitable point in the irrigation system for receiving the entire flow of water to be metered. A casting 11 secured to tube 10 by clamps 12 is formed with a rotor chamber 13 communicating with the interior of tube 10 through an orifice 14 in the wall of the latter. If desired, the tube 10 may be formed integrally with casting 11 as indicated in Figure 3. Casting 11 is provided with alined bearings 15, 16 for mounting the shaft 17 of the meter rotor 18 outside the tube 10 so that only the extremities of the blades 20 of the paddle wheel type rotor project into tube 10 through the orifice 14, which is covered by the casting 11. Thus, the rotation of rotor 18 is not seriously interfered with by gravel or sand entrained in the water since only the extremities of the blades 20 at one side of the axis of rotation project into the flow and they are displaced by entrained solid matter as they are by the flow of water.

The rotor shaft 17 is mounted in hard rubber bushings 21, 22 fixed in the bearings 15, 16 and a step bearing 23 is provided below the end of bushing 22 for the end of shaft 17. At its upper end, shaft 17 is connected to operate reduction gearing 25 mounted in a casing 26, supported on the upper end of casting 11, for driving the registering elements of the meter. The bushing 22 extends above the end of bearing 16 and is tapered to substantially the outer diameter of shaft 17 so as not to present a shoulder on which sand or other abrasive material entrained in water entering the rotor chamber 13 may lodge about the shaft. In the embodiment illustrated the hub 27 of rotor 18 is recessed at 28 on its under side to accommodate the tapered end of bushing 22.

Shaft 17 is formed with an axial passage 30 communicating at its upper end with fluid lubricant or other liquid in the gear casing 26. Passage 30 may terminate slightly above the lower end of shaft 17, or, as shown, may extend to the end thereof where it is closed by the member 31 engaging the step bearing 23. In either event, a radial aperture 32 near the lower end of shaft 17 communicates with passage 30 and with a groove 33 extending along the surface of shaft to the end thereof so that the space about the step bearing 23 between the latter and the lower end of bushing 22 communicates with passage 30 and is maintained full of liquid flowing from the gear casing 26.

In operation there is a certain amount of unavoidable up and down motion of shaft 17 and rotor 18 because step bearing 23 wears slightly, thus permitting such motion if it did not originally exist. With the present invention the upward movement of shaft 17 is prevented from producing a vacuum in the space about the step bearing that would act to draw water and entrained abrasive material from rotor chamber 13 downwardly between the shaft 17 and bushing 22 to become imbedded in the hard rubber bushing and thus cause wear on the shaft. This is due to provision of the axial passage 30 in shaft 17 which extends into the liquid in gear casing 26 so that upon upward movement of the shaft liquid is displaced from casing 26 and flows through passage 30, radial aperture 32 and groove 33 to maintain the space about the step bearing 23 filled with liquid so that the pumping action of the shaft does not suck water and entrained abrasive material into this space from the rotor chamber 13. Moreover, sand which may lodge on the bottom of rotor chamber 13 cannot enter the bushing 22 on downward movement of shaft 17 due to extension of the bushing above the upper end of bearing 16 and the tapering of the end of the bushing prevents sand lodging thereon and finding its way between the bushing and shaft.

Although the improved rotor mounting of the present invention has been described in conjunction with an irrigation meter having a rotor of the paddle wheel type it is also applicable to rotors of other types, such as turbine wheels, and also is not confined to meters but may also be applied to other devices, such as rotary pumps, where it is desired to reduce wear on the bearings due to abrasive material entrained in the liquid in which such devices operate.

What I claim is:

1. In a liquid dispensing system having a conduit for directing the flow of a liquid which entrains abrasive material, a rotor chamber communicating with the interior of said conduit, and a rotor in said chamber; alined bearings at opposite ends of said chamber; bushings mounted in said bearings, one of said bushings terminating short of the end of the related bearing which is remote from said chamber; a liquid containing casing mounted at the outer end of the other bearing; and a hollow shaft for supporting said rotor mounted in said bushings and having one end communicating with the liquid in said casing to maintain the space in said related bearing beyond the end of the bushing therein filled with liquid directed through said shaft from said casing to prevent liquid and abrasive material from being drawn between said shaft and bushing from said rotor chamber upon axial movement of said shaft during operation of said rotor.

2. In a liquid dispensing system having a conduit for directing the flow of a liquid entraining abrasive material, a rotor chamber communicating with the interior of said conduit, and a rotor in said chamber; vertically alined bearings opening into the top and bottom of said chamber and extending outwardly therefrom; bushings mounted in said bearings, the bushing for the lower bearing terminating short of the outer end thereof; a liquid containing casing mounted above the upper bearing; a step-bearing mounted in said lower bearing beyond the outer end of the bushing therein; and a shaft for supporting said rotor mounted in said bushings and on said step-bearing, said shaft being formed with an axial passage communicating with said casing and with the space about said step-bearing for maintaining said space filled with liquid directed therethrough from said casing to prevent liquid and entrained abrasive material being drawn between said bushing and said shaft upon axial movement of the latter during operation of said rotor.

3. In a liquid dispensing system having a conduit for directing the flow of a liquid entraining abrasive material, a rotor chamber communicating with the interior of said conduit, and a rotor in said chamber; alined bearings opening into opposite sides of said chamber and extending outwardly therefrom; bushings mounted in said bearings, one of said bushings terminating short of the outer end of the related bearing; a liquid containing casing mounted at the outer end of the other bearing; a step-bearing mounted in said related bearing beyond the outer end of the bushing therein; and a shaft for supporting said rotor mounted in said bushings and on said step-bearing, said shaft being formed with an axial passage communicating at one end of the shaft with the liquid in said casing, a groove adjacent its other end communicating with the space about said step-bearing, and a radial aperture extending between said axial passage and groove for maintaining said space filled with liquid directed through said shaft from said casing.

4. In a liquid dispensing system having a conduit for directing the flow of liquid entraining abrasive material, a rotor chamber communicating with the interior of said conduit, and a rotor in said chamber; a shaft for supporting said rotor, a bearing opening into said chamber and extending outwardly from the bottom thereof, and a bushing for said shaft in said bearing, said bushing projecting beyond the inner end of said bearing for preventing abrasive material that accumulates about said end of said bearing and on the bottom of said rotor chamber entering said bushing.

5. In a liquid dispensing system having a conduit for directing the flow of liquid entraining abrasive material, a rotor chamber communicating with the interior of said conduit, and a rotor in said chamber; a shaft for supporting said rotor, a bearing opening into the bottom of said chamber and extending downwardly therefrom, and a bushing for said shaft in said bearing, said bushing projecting into said rotor chamber beyond the inner end of said bearing and being tapered at its inner end to the diameter of said shaft for preventing abrasive material lodging about said shaft at the said end of said bushing.

CHARLES S. HAZARD.